Figure 1:
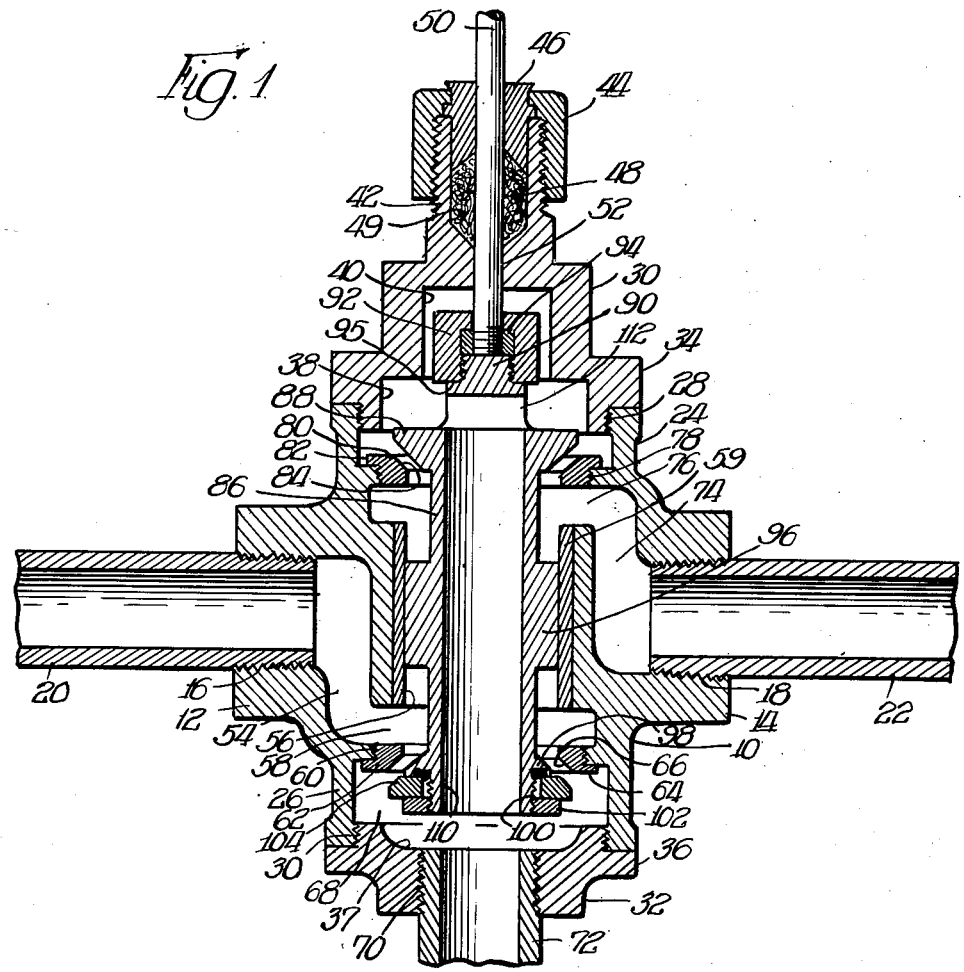

July 1, 1952  E. E. MODES  2,601,989

BALANCED THREE-WAY VALVE

Filed Oct. 8, 1947

INVENTOR.
Edward E. Modes,
BY
attys.

UNITED STATES PATENT OFFICE 2,601,989

BALANCED THREE-WAY VALVE

Edward E. Modes, Chicago, Ill., assignor to The Powers Regulator Company, Chicago, Ill., a corporation of Illinois Application October 8, 1947, Serial No. 778,687

9 Claims. (Cl. 277—13)

This invention pertains to balanced three-way valves.

It is an object of this invention to provide a valve construction wherein a poppet valve is provided which is readily adjusted for concentricity.

Another object of the invention is to provide a balanced three-way valve having upper and lower poppet valves, the construction being such that one of the poppet valves is permitted adjustment for concentricity with respect to the other poppet valve.

Another object of the invention is to provide a three-way valve construction wherein communication between the ports is allowed when the valve is in its intermediate position.

Another object of the invention is to provide a balanced three-way valve construction wherein a passageway is provided through the piston, permitting communication between the three ports of the valve, when the valve is in an intermediate position.

Another object of the invention is to provide a balanced three-way valve of simplified body construction, one wherein the possibility of leakage is rendered virtually impossible, the difficulty of machining double poppet valves is eliminated, and one wherein there is a more complete balance.

With these and various other objects in view, the invention consists of certain novel features of construction and operation as will be more fully described and particularly pointed out in the specification, drawings and claims appended hereto.

In the drawings, which illustrate embodiments of the device and wherein like reference characters are used to designate like parts—

Figure 2:
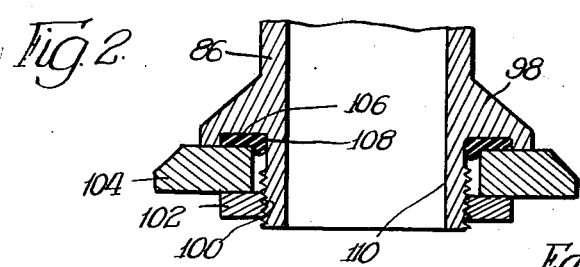

Figure 1 is a sectional elevation of a three-way balanced valve embodying the invention; and Figure 2 is an enlarged fragmentary sectional elevation of the lower end of the poppet valve body, showing the mounting of the removable valve poppet.

The valve assembly comprises the housing body 10 having radially disposed bosses 12 and 14 threaded as at 16 and 18 for connection to pipes 20 and 22. The body is preferably symmetrical about the longitudinal axis and is provided with the upper and lower walls 24 and 26 threaded as at 28 and 29 for threaded connection with the bonnet 30 and bottom closure 32, respectively, the bonnet having a radial flange 34 overlying the wall 24, and the bottom closure having the radial flange 36 overlying the wall 26 and being recessed as at 37.

The bonnet 30 is provided with the communicating recesses or passages 38 and 40 and is provided with the upwardly extended threaded flange 42 provided with the nut 44 retaining the gland 46. The gland is adapted to compress suitable packing 48 in the packing recess 49 of bonnet 30 whereby a stuffing box is formed preventing leakage around the operating stem 50. The stem extends through the stuffing box and the passage 52 in the bonnet which communicates with recess 40 and the packing retaining chamber 49 of the stuffing box.

Connection 20 communicates with the downwardly extending passage 54 in the body 10, said passage communicating with the cylinder 56 through port 58, said cylinder being formed by the insert 59, preferably of non-corrosive material, for example, if the body 10 is of cast iron, the cylinder may be of brass, stainless steel, monel or the like. The body adjacent the port 58 is threaded as at 60 and the lower poppet valve seat 62 is secured thereto, preferably being positioned by means of the radial flange 64 and having a relatively narrow poppet valve engaging surface 66, shown exaggeratively large in the drawings for clarity. The circular opening of the lower seat member 62 has the same diameter as that of the bore of cylinder 56. The bore of cylinder 56 communicates with the passage 68 formed in the lower part of the valve body and in the bottom closure through the opening in seat member 62.

Bottom closure 32 is threaded as at 70 for connection to the pipe 72. Pipe 22 communicates with the upwardly extending passage 74 similar to the downwardly extending passage 54 which in turn communicates through the port 76, with the upper part of the cylinder 56. The body is threaded as at 78 for connection to the upper seat member 80 similar to seat member 62, being positioned by the radial flange 82 having a relatively narrow poppet valve engaging surface 84 shown exaggeratively large in the drawings for clarity. The upper part of cylinder 56 thus communicates through the opening in seat member 80 with the recesses 38 and 40.

It will be seen with the body construction illustrated that the valve can be readily assembled as there are no tops or bottoms, or rights or lefts and if bosses 12 and 14 are disposed in opposed relation it is symmetrical about its vertical axis. Thus the body can be turned over and the bonnet threaded at 28 and the bottom closure threaded at 29, and pipes 20 and 22 can be interchanged. This construction, of course, simplifies manufacture and assembly.

Slidable poppet valve piston or valve body 86 is provided with the upper valve disc or poppet valve 88 adapted to seat on seat member 80, the poppet valve body being provided with the threaded head 90 adapted to receive the nut 92 whereby operating stem 50 may be secured to the body through the threaded adjustable nut 94 secured to the lower end of the operating stem. If desired the nut 92 may be seated on seat 95 so that the nut 94 is not fixed whereby stem 50 may be rotatable. It is, of course, understood that the stem may be operated either by a motor or manually.

Body 86 is provided with the elongated piston 96 which is preferably made relatively long for any given diameter of piston to hold leakage past said piston at a minimum and said piston is adapted to be slidably mounted in the cylinder 56 and the lower end of the body 86 is provided with the positioning shoulder or flange 98 and is threaded at 100 for receiving the securing nut 102, whereby the removable lower valve disc or poppet valve 104 may be secured to the body 86. Flange 98 is recessed as at 106 for reception of the gasket 108, said gasket being preferably of soft metal such as copper or lead, though a plastic or other material may be used. When nut 102 is tightly pulled down the gasket deforms plastically into the annular opening or recess between poppet valve 104 and the flange 98 and body 86 causing a pressure tight joint to be formed and holding a definite dimension between poppet valves 104 and 88, but permitting adjustment of the poppet valve 104 so that it is always concentric with its seat 62. When the piston 96 is in its mid-position, poppet valves 104 and 88 are preferably in equal open positions. The valve body 86 is provided with the axial opening 110 communicating with passage 68, and with the transverse passage 112 which in turn communicates with recess 38.

It will be seen that in the valve construction shown recesses 38 and 40 are sufficiently large to accommodate poppet valve 88 and nut 92, respectively, when poppet valve 104 is moved to closed position, and when poppet valve 88 is moved to closed position recess 37 is sufficiently large to accommodate nut 102.

The inside diameter of seat members 80 and 62 and that of cylinder 56 are equal, and are smaller than the outside diameter of poppet valves 88 and 104, while the outside diameter of flange 98 is smaller than the inside diameter of seats 62 and 80 and that of cylinder 56.

In assembling the valve construction, the housing body 10, of course is not connected to pipes 20, 22 or 72. The bonnet 30 and the bottom closure 32 are not applied to the body 10 until seats 62 and 80 are in place as also is cylinder 56. The body 10 is disposed in what is ultimately an inverted position and the poppet valve 104 is placed on its seat 62, or in other words, the valve is assembled upside down. Valve body 86 is provided with a recess 106 and said body is inserted upwardly (with the body in upside down position) until the threaded end of valve body 86 is sufficiently through seat 62 to permit application thereto of the gasket 108, poppet 104 and nut 102, but at this time there is no contact between the gasket 108 and poppet valve 104 as it has been placed in recess 106. The valve body is held resiliently in place and the nut 102 is then made tight, thus tightening the poppet valve 104 against gasket 108 deforming said gasket, thereby providing a tight joint, poppet valve 104 having been positioned concentric with respect to the seat 62. Thus the poppet valve 104 is properly positioned with respect to its seat 62 and a definite dimension is established between poppet valves 104 and 88.

If the stem has not previously been assembled with the valve body 86, stem 50 can then be secured to the upper part of poppet body 86 by securing nut 92 to the valve body 86, nut 92 having previously been applied to the stem embracing securing nut 94. The bonnet 30 may then be secured to the body 10 and the stuffing box completed. The assembly of bonnet 30 of course will depend upon the kind of operating mechanism utilized.

In operation of this valve assembly, assuming that pipes 20 and 22 are inlets and that pipe 72 is an outlet, if the piston is in an intermediate position with both poppet valves 88 and 104 open, the incoming fluids will be mixed adjacent the outlet as in recess 37, as flow will occur from inlet 20, through passage 54 and past poppet valve 104 to recess 37. Also flow will occur through passage 74, past poppet valve 88 and through passages 112 and 110 to recess 37 where mixing occurs before discharge. Moving the stem 50 to move the poppet valves toward their seats varies the flow from pipes 20 and 22 to recess 37 as the openings between the poppet valves and their seats are varied. Should poppet valve 104 be closed only flow will occur between pipes 22 and pipe 72, and if poppet valve 88 is closed only flow between pipes 20 and 72 occurs. The surfaces 66 and 84 of the seat members being relatively narrow permit a balanced condition of the valve body because when poppet valve 88 is seated, the area of the piston 96 subjected to pressure through port 76 is substantially equal to that on the underside of poppet valve 88 subjected to the same pressure; when poppet valve 104 is closed the area of the piston 96 subjected to pressure through port 58 is substantially equal to that on the underside of poppet valve 104 subjected to the same pressure; and the area of the side of poppet valve 88 in passage 38 is substantially equal to the area of the poppet valve 104 and nut 102 in passage 68. And all of the said areas are substantially equal to each other, inasmuch as the area of stem 50 is relatively small.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

I claim:

1. In valve construction, the combination of a housing body having bosses each provided with an opening, a cylinder disposed in said body and on the axis of said body and so disposed in spaced relation to said body and bosses as to form passages with said body, one of said passages connecting one end of said cylinder to the opening in one of said bosses, and the other passage connecting the other end of said cylinder to the opening in the other boss, valve seats provided in said body spaced from each end of said cylinder, a valve body extending axially of said cylinder and having a piston intermediate its ends slidably mounted in said cylinder, a poppet valve provided adjacent each end of said valve body spaced from said piston and each adapted to seat on one of said valve seats, axial movement of said piston causing one of said poppet valves to be moved toward fully closed position while the other is being moved toward fully open position, the poppet valves both being substantially equally open when the piston is in its midposition in the cylinder, a closure for one end of said housing body having an opening therein disposed adjacent one of said poppet valves and located on the side of the same opposite one of the first named passages and which passage communicates with the opening through the valve seat for the said poppet valve, said valve body having an axial passage connecting said opening in the closure with a third passage disposed adjacent the other poppet valve and located on the side of the same opposite the other of said first named passages, the said third passage communicating with the said other of the first named passages through the valve seat for the other poppet valve, a bonnet for closing the opposite end of said housing body, said bonnet having a stuffing box, and a valve stem secured to one end of said valve body and extending through said bonnet and stuffing box.

2. In valve construction, the combination of a housing body having bosses each provided with an opening, a cylinder disposed in said body and on the axis of said body and so disposed in spaced relation to said body and bosses as to form passages with said body, one of said passages connecting one end of said cylinder to the opening in one of said bosses, and the other passage connecting the other end of said cylinder to the opening in the other boss, valve seats provided in said body spaced from each end of said cylinder, a valve body extending axially of said cylinder and having a piston intermediate its ends slidably mounted in said cylinder, a poppet valve provided adjacent each end of said valve body spaced from said piston and each adapted to seat on one of said valve seats, axial movement of said piston causing one of said poppet valves to be moved toward fully closed position while the other is being moved toward fully open position, one of said poppet valves comprising a disc adapted to be removably secured to said valve body, a closure for one end of said housing body having an opening therein disposed adjacent one of said poppet valves and located on the side of the same opposite one of the first named passages and which passage communicates with the opening through the valve seat for the said poppet valve, said valve body having an axial passage connecting said opening in the closure with a third passage disposed adjacent the other poppet valve and located on the side of the same opposite the other of said first named passages, the said third passage communicating with the said other of the first named passages through the valve seat for the other poppet valve, a bonnet for closing the opposite end of said housing body, said bonnet having a stuffing box, and a valve stem secured to one end of said valve body and extending through said bonnet and stuffing box.

3. In valve construction, the combination of a housing body having bosses each provided with an opening, a cylinder disposed in said body and on the axis of said body and so disposed in spaced relation to said body and bosses as to form passages with said body, one of said passages connecting one end of said cylinder to the opening in one of said bosses, and the other passage connecting the other end of said cylinder to the opening in the other boss, valve seats provided in said body spaced from each end of said cylinder, a valve body extending axially of said cylinder and having a piston intermediate its ends slidably mounted in said cylinder, a poppet valve provided adjacent each end of said valve body spaced from said piston and each adapted to seat on one of said valve seats, axial movement of said piston causing one of said poppet valves to be moved toward fully closed position while the other is being moved toward fully open position, one of said poppet valves comprising a disc adapted to be removably secured to said valve body, a relatively soft gasket disposed between said valve body and disc, a closure for one end of said housing body having an opening therein disposed adjacent one of said poppet valves and located on the side of the same opposite one of the first named passages and which passage communicates with the opening through the valve seat for the said poppet valve, said valve body having an axial passage connecting said opening in the closure with a third passage disposed adjacent the other poppet valve and located on the side of the same opposite the other of said first named passages, the said third passage communicating with the said other of the first named passages through the valve seat for the other poppet valve, a bonnet for closing the opposite end of said housing body, said bonnet having a stuffing box, and a valve stem secured to one end of said valve body and extending through said bonnet and stuffing box.

4. In valve construction, the combination of a housing body having bosses each provided with an opening, a cylinder disposed in said body and on the axis of said body and so disposed in spaced relation to said body and bosses as to form passages with said body, one of said passages connecting one end of said cylinder to the opening in one of said bosses, and the other passage connecting the other end of said cylinder to the opening in the other boss, valve seats provided in said body spaced from each end of said cylinder, a valve body extending axially of said cylinder and having a piston intermediate its ends slidably mounted in said cylinder, a poppet valve provided adjacent each end of said valve body spaced from said piston and each adapted to seat on one of said valve seats, axial movement of said piston causing one of said poppet valves to be moved toward fully closed position while the other is being moved toward fully open position, a closure for one end of said housing body having an opening therein disposed adjacent one of said poppet valves and located on the side of the same opposite one of the first named passages and which passage communicates with the opening through the valve seat for the said poppet valve, said valve body having an axial passage connecting said opening in the closure with a third passage disposed adjacent the other poppet valve and located on the side of the same opposite the other of said first named passages, the said third passage communicating with the said other of the first named passages through the valve seat for the other poppet valve, a bonnet for closing the opposite end of said housing body, said bonnet having a stuffing box, and a valve stem secured to one end of said valve body and extending through said bonnet and stuffing box.

5. In valve construction, the combination of a housing body having bosses each provided with an opening, a cylinder disposed in said housing and on the axis of said body and so disposed in spaced relation to said body and bosses as to form passages with said body, one of said passages connecting one end of said cylinder to the opening in one of said bosses, and the other passage connecting the other end of said cylinder to the opening in the other boss, valve seats provided in said body spaced from each end of said cylinder, a valve body extending axially of said cylinder and having a piston intermediate its ends slidably mounted in said cylinder, a poppet valve provided adjacent each end of said valve body spaced from said piston and each adapted to seat on one of said valve seats, axial movement of said piston causing one of said poppet valves to be moved toward fully closed position while the other is being moved toward fully open position, the poppet valves both being substantially equally open when the piston is in its midposition in the cylinder, one of said poppet valves comprising a disc adapted to be removably secured to said valve body, a closure for one end of said housing body having an opening therein disposed adjacent one of said poppet valves and located on the side of the same opposite one of the first named passages and which passage communicates with the opening through the valve seat for the said poppet valve, said valve body having an axial passage connecting said opening in the closure with a third passage disposed adjacent the other poppet valve and located on the side of the same opposite the other of said first named passages, the said third passage communicating with the said other of the first named passages through the valve seat for the other poppet valve, a bonnet for closing the opposite end of said housing body, said bonnet having a stuffing box, and a valve stem secured to one end of said valve body and extending through said bonnet and stuffing box.

6. In valve construction, the combination of a housing body having bosses each provided with an opening, a cylinder disposed in said housing and on the axis of said body and so disposed in spaced relation to said body and bosses as to form passages with said body, one of said passages connecting one end of said cylinder to the opening in one of said bosses, and the other passage connecting the other end of said cylinder to the opening in the other boss, valve seats provided in said body spaced from each end of said cylinder, a valve body extending axially of said cylinder and having a piston intermediate its ends slidably mounted in said cylinder, a poppet valve provided adjacent each end of said valve body spaced from said piston and each adapted to seat on one of said valve seats, axial movement of said piston causing one of said poppet valves to be moved toward fully closed position while the other is being moved toward fully open position, the poppet valves both being substantially equally open when the piston is in its midposition in the cylinder, one of said poppet valves comprising a disc adapted to be removably secured to said valve body, a relatively soft gasket disposed between said valve body and disc, a closure for one end of said housing body having an opening therein disposed adjacent one of said poppet valves and located on the side of the same opposite one of the first named passages and which passage communicates with the opening through the valve seat for the said poppet valve, said valve body having an axial passage connecting said opening in the closure with a third passage disposed adjacent the other poppet valve and located on the side of the same opposite the other of said first named passages, the said third passage communicating with the said other of the first named passages through the valve seat for the other poppet valve, a bonnet for closing the opposite end of said housing body, said bonnet having a stuffing box, and a valve stem secured to one end of said valve body and extending through said bonnet and stuffing box.

7. In valve construction, the combination of a housing body having openings, a wall disposed in said body and forming a chamber and so disposed in spaced relation to portions of said body as to form passages with said body, one of said passages connecting said chamber to one opening, and the other passage connecting said chamber to the other opening, valve seats provided in said body spaced from said chamber, a valve body mounted in said chamber, valve members provided by said valve body and spaced from each other and each adapted to seat on one of said valve seats, one of said valve members being movable toward fully closed position while the other is being moved toward fully open position, a closure for one end of said housing body having an opening therein communicating with one passage when the adjacent valve member is open, means connecting said opening in said closure with the other passage, a bonnet having a stuffing box, and a valve operating member secured to one end of said valve body and extending through said bonnet and stuffing box.

8. In valve construction, the combination of a housing body having bosses each provided with an inlet opening, a wall in said body forming a cylindrical chamber so disposed in spaced relation to portions of said body as to form first and second passages within said body, the first passage connecting said chamber to one inlet opening, and the second passage connecting said chamber to the other inlet opening, valve seats within the housing body at respective ends and in axial alignment with the cylindrical chamber, one valve seat forming an outlet opening for the first passage and the other valve seat forming an outlet opening for the second passage, a valve body extending axially of said cylindrical chamber and having a piston intermediate its ends slidably mounted in said chamber, a valve member at each end of the valve body and each valve member being adapted to seat on one of said valve seats, axial movement of said piston causing one valve member to be moved toward fully closed position while the other is being moved toward fully open position, a closure for one end of the housing body having a discharge outlet, said discharge outlet when the valve body is in open position communicating with the first passage through the valve seat which forms an outlet opening for said first passage, a bonnet for closing the opposite end of said housing body, said bonnet providing a third passage having connecting relation when the valve body is in open position with the second passage through the valve seat which forms an outlet opening for said second passage, said valve body having a longitudinal passage through the same connecting said discharge opening in the closure with the third passage, and a valve stem secured to one end of the valve body and extending through said bonnet.

9. A valve construction as defined by claim 8 wherein one valve member comprises a disc adapted to be removably secured to the valve body, a relatively soft gasket disposed between said valve body and disc, and wherein the inside diameters of the chamber and said valve seats are equal but of less size than the maximum outside diameter of the valve members.

EDWARD E. MODES.

REFERENCES CITED

The following references are of record in the file of this patent:

UNITED STATES PATENTS

| Number | Name | Date |
|---|---|---|
| 981,711 | Steiner | Jan. 17, 1911 |
| 1,177,085 | Atkins | Mar. 28, 1916 |
| 1,182,287 | McNeil | May 9, 1916 |
| 1,419,254 | Grebe | June 13, 1922 |
| 1,556,227 | Lemethis | Oct. 6, 1925 |
| 1,634,781 | Hall | July 5, 1927 |
| 1,813,464 | Price | July 7, 1931 |

FOREIGN PATENTS

| Number | Country | Date |
|---|---|---|
| 356,292 | Great Britain | Sept. 10, 1913 |